United States Patent [19]

Schüler et al.

[11] Patent Number: 5,718,480
[45] Date of Patent: Feb. 17, 1998

[54] VEHICLE SEAT

[75] Inventors: Rolf Schüler, Heiligenhaus; Heinz Voss, Leverkusen; Thorsten Nottebaum, Remscheid; Ulrich Lehmann, Alfter-Bonn, all of Germany

[73] Assignee: Keiper Recaro GmbH & Co., Remscheid, Germany

[21] Appl. No.: 679,093

[22] Filed: Jul. 12, 1996

[30] Foreign Application Priority Data

Jul. 28, 1995 [EP] European Pat. Off. ............ 95111884

[51] Int. Cl.⁶ ............................................. B60N 2/22
[52] U.S. Cl. ........................ 297/362; 297/367; 475/162
[58] Field of Search ............................ 297/362, 367, 297/354.12, 366, 368; 475/162, 176, 177

[56] References Cited

U.S. PATENT DOCUMENTS

| | | | |
|---|---|---|---|
| 4,770,464 | 9/1988 | Pipon et al. | 297/367 |
| 4,884,844 | 12/1989 | Kershaw et al. | |
| 4,887,863 | 12/1989 | Caillol | 297/362 |
| 5,154,475 | 10/1992 | Kafitz | 297/362 |
| 5,161,856 | 11/1992 | Nishino | 297/367 |
| 5,516,198 | 5/1996 | Yokoyama | 297/362 |

FOREIGN PATENT DOCUMENTS

| | | |
|---|---|---|
| 2051767 | 10/1968 | Australia. |
| 0233822 | 8/1987 | European Pat. Off.. |
| 0308374 | 3/1989 | European Pat. Off.. |
| 1222780 | 2/1971 | United Kingdom. |
| 2051220 | 1/1981 | United Kingdom. |
| 2257904 | 1/1993 | United Kingdom. |

*Primary Examiner*—Peter R. Brown
*Attorney, Agent, or Firm*—Wigman, Cohen, Leitner & Myers, P.C.

[57] ABSTRACT

With the case of a vehicle seat, in particular for motor vehicles, consisting of individual structural components that include a seat and a seat back, the latter with connecting joint fittings that may be locked at a desired incline to the seat and swung around a swivel pin running in the transverse direction of the seat, the joint fittings (5) can be chosen from at least two groups, including one from gear fittings and the other from groove fittings (5).

10 Claims, 3 Drawing Sheets

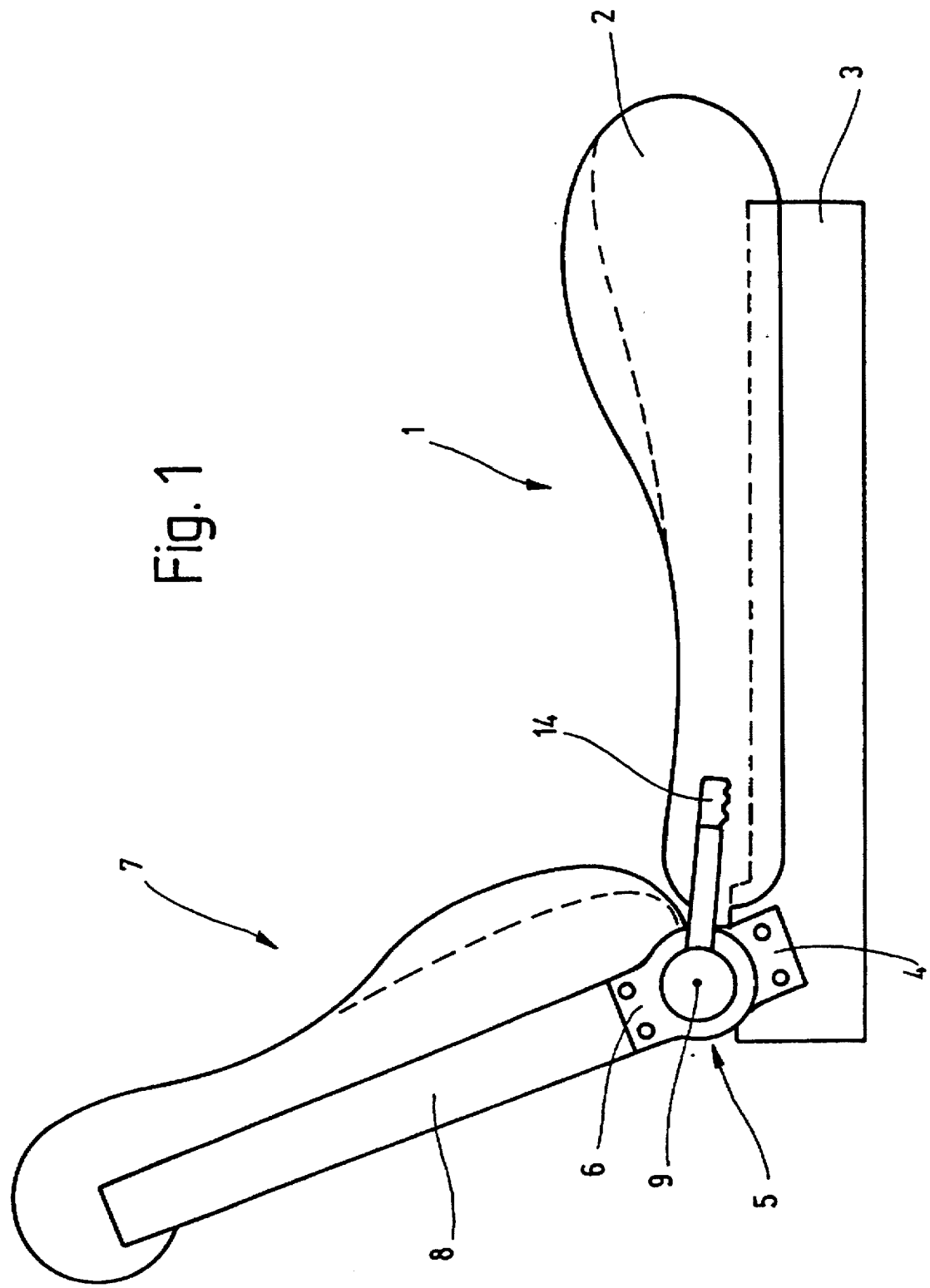

5,718,480

VEHICLE SEAT

FIELD OF INVENTION

The invention concerns a vehicle seat, in particular a motor vehicle seat, consisting of individual structural components that include the seat and seat back, the latter with connecting joint fittings that may be locked at a desired incline with the seat and swung around a swivel pin running in the transverse direction of the seat.

BACKGROUND OF INVENTION

Known joint fittings of this type can be classified into at least two types. Belonging to one group are the so-called gear fittings in which the fitting part connected to the seat back is swung around in relation to the fitting part connected to the seat by means of a gear and, if the gear is not self-locking, it is locked by brakes, whereby the gear is powered by hand, for example with the help of a hand wheel, or by means of a motor. The incline of the seat back is continuously adjustable by means of this gear fitting. Belonging to the other group are the so-called groove fittings in which the upper fitting part connected to the seat back can be locked form-fit to the fitting part connected to the seat by means of locking elements. To be able to swing the upper fitting part around in relation to the lower fitting part, the locking elements must be brought into the release position, for example by means of a hand-operated lever that can be swung around the articulated axle. The snap-in locking device can be designed in such a way that only a stepwise change in the swinging position of the upper fitting part is possible. There are, however, groove fittings that make the continuous positioning of the incline angle of the seat back possible.

Because there are some persons who prefer gear fittings and some who favor groove fittings, the invention seeks to solve the task of creating a vehicle seat while taking into account various desires in the most inexpensive way. A vehicle seat with the properties solves the problem.

SUMMARY OF THE INVENTION

Because the two joint fittings needed for the connection of the seat back to the seat can be chosen from at least two groups that include joint fittings and groove fittings—thus the seat does not have to be matched to the various joint fittings—the seat back can be connected to the seat either by means of a gear fitting or a groove fitting when the vehicle seat according to the invention is mounted. One can even later exchange one of the one group for others of the other group due to the property that allows for a choice of joint fittings, as long as detachable connections between the joint fittings and the seat and seat back are foreseen. By gear fittings are meant those fittings by which a swinging motion of the one fitting part follows in relation to the other fitting part in steps or continuously with the help of a drive element by means of a gear that can have any design, whereby the drive element can be a manually operated element, in particular a hand wheel, or a motor. The gear can be self-locking. If it is not self-locking, the locking of the two fitting parts takes place by means of a detachable brake. By groove fittings are meant those fittings which provide locking elements that can move in relation to one another to lock the fitting part to be connected to the seat back; the locking elements work together in their locked position and allow for a swinging motion of the two fitting parts relative to each other in their release position. An operating arm that is powered manually or by a motor exists for the operation of the locking elements. The ability to adjust the one fitting part in relation to the other is possible continuously or only in steps. As long as no separate recoil spring for the seat back exists, a recoil spring that seeks to swing the seat back forward can be integrated into the groove fitting.

With the preferred working form the position of the swivel pin with respect to the seat and the seat back is independent of whichever type of joint fitting was chosen. Seat comfort, which is also dependent on the position of the swivel pin, thus remains unaffected by the choice of the joint fittings.

So that neither the seat nor the seat back need to be equipped with various connection points for the various joint fittings, the fitting dimensions of both types of joint fittings should, preferably, be the same.

BRIEF DESCRIPTION OF THE DRAWINGS

In what follows the invention is explained in detail through the use of working examples represented in drawings. Shown are the following figures.

FIG. 1 is a side view of a working example with groove fittings to connect the seat back to the seat that is represented diagrammatically.

DETAILED DESCRIPTION OF THE DRAWINGS

Figure 3:
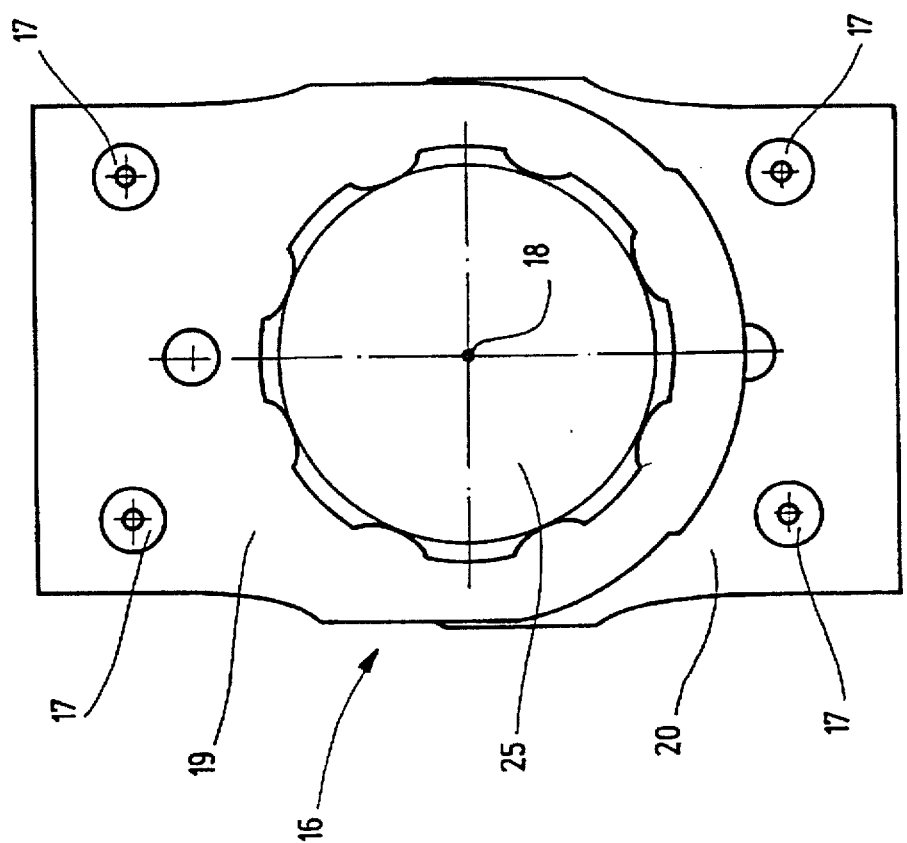
FIG. 3 is a corresponding view of a gear fitting that can be chosen instead of a groove fitting in accordance with FIG. 2.

Referring now to the drawings wherein like elements are designated by like numerals, the seat of a vehicle, the whole of which is designated as (1), displays seat upholstery (2), which is held by upholstery supports that are not represented in the diagram and that are connected directly or indirectly to the seat mount (3). An indirect connection exists when the seat displays an elevation adjuster, incline adjuster, or both adjusters, and they are positioned between the seat mount (3) and the upholstery supports of the seat upholstery (2).

The lower fitting part (4) of each joint fitting (5) is fastened in the area of the back end of both sides of the seat mount (3). The upper fitting part (6) of the joint fittings (5), which are of the same design, is connected to the upholstery supports (8) of one side of the seat back, the whole of which is designated as (7), in such a way that the seat back (7) can be swung around in relation to the seat (1) in an axle (9) running in the transverse direction of the seat.

Figure 4:
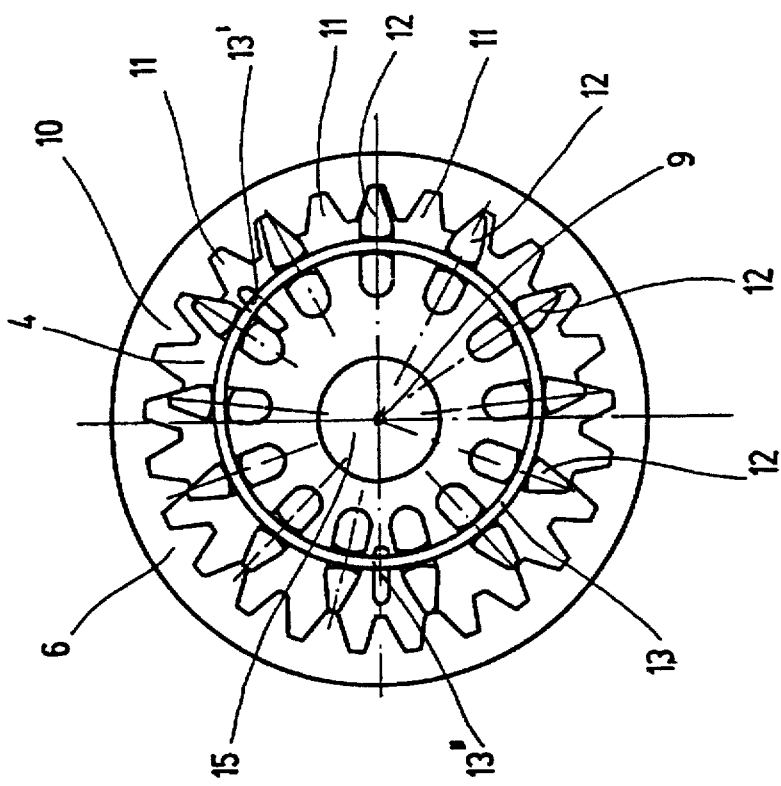
FIG. 4 is a view of the snap-in locking device of the groove fitting in accordance with FIG. 2.

To be able to change the inclined position of the seat back (7) continuously, the joint fitting (5) displays a snap-in locking device, which is represented diagrammatically in FIG. 4. An internal gear (10), which is concentric to the axle (9) and has evenly positioned groove openings (11) distributed over the entirety that open radially inward, is foreseen on one of the two fitting parts (in the working example on the upper fitting part (6)). This internal gear (10) can be foreseen on a ring connected tightly with the fitting part or directly on the fitting pan. The other fitting part, in the working example the lower fitting part (4), is provided with radially running pin guides for each locking body (12). These locking bodies (12), positioned evenly over the entirety, taper radially outward in a wedge shape into the end section as they mesh with the groove openings (11), while the groove openings (11) open radially inward in a wedge shape. The number of the groove openings (11) and locking bodies (12), as well as the ratio of both teeth, are chosen so that at least two of the locking bodies (12) engage in two of the groove openings (11) with any swinging position of the upper fitting part (6) and can lock the upper fitting part (6) to the lower fitting part (4) without backlash in both rotation directions. The locking bodies (12) designed in the form of bolts are pressed outward radially by a prestressed annular spring (13), which spans more than one winding, when a control lever (14) is operated, which is positioned to be able to swing on a pivot pin (15) that connects both fitting parts with a pin and defines the axle (9). The one end (13') of the annular spring (13) cannot be moved in circumferential direction, but is connected so it can move radially with the lower fitting part (4), while the end (13") can be moved in circumferential direction and is connected so it can move radially with the control lever (14). If the control lever is pulled upwards as viewed in FIG. 1, that is, if it is swung counterclockwise, then the end (13") of the annular spring (13) is carried along counterclockwise as viewed in FIG. 4, thus causing the annular spring (13) to be stressed more strongly. As a consequence it tightens and thus disengages all of the locking bodies (12) from the groove openings (11). The seat back (7) can then be swung to any desired angle in relation to the seat (1). When the desired new position is obtained, the control lever (14) needs only to be released. The annular spring (13) then relaxes, whereby at least two of the locking bodies (12) engage at least incompletely in two of the groove openings (11), and the two fitting parts (4 and 6) again lock without backlash form-fit in both directions. In addition, the control lever (14) is swung back in its original position again.

Figure 2:
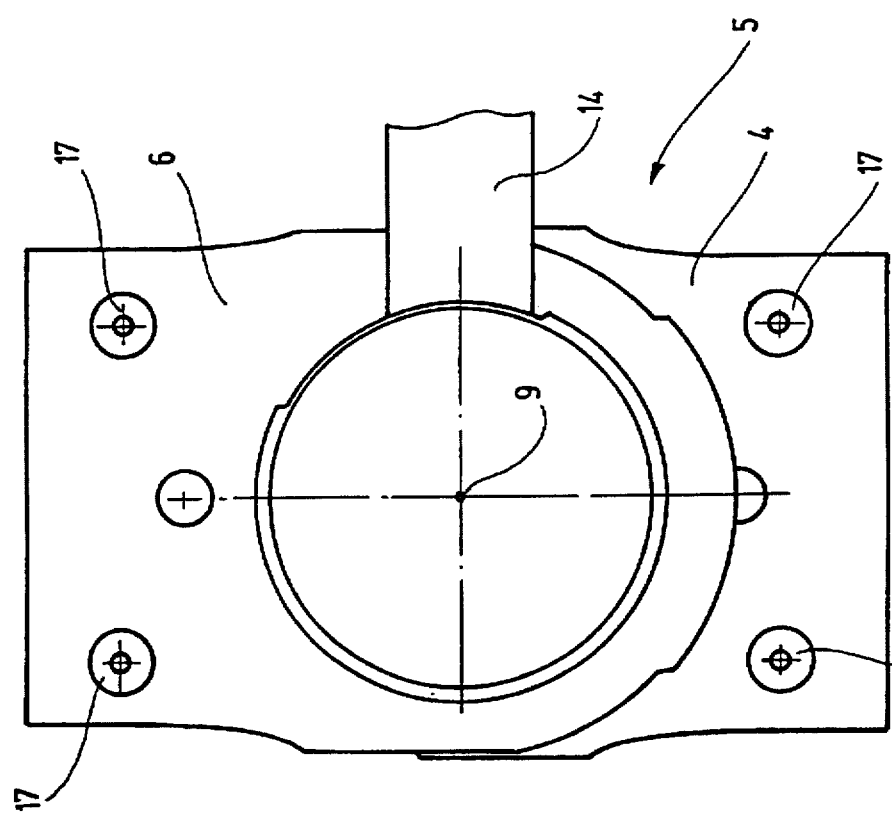
FIG. 2 is a view of one of the groove fittings of the working example.

As long as the seat is to be equipped with a joint fitting (16) that is designed as a so-called gear fitting, it needs neither a change of the seat mount (3) nor a change in the upholstery supports (8) of the seat back (7). The joint fitting (16) that is designed as a groove fitting and the joint fitting (16) that is designed as a gear fitting have, as FIGS. 2 and 3 show, the same external measurements and fitting dimensions, especially the same position of the connection points represented as bolts (17), namely with respect to the theoretical axles (9 or 18). The two joint fittings (5 and 16) in the working example are not only congruent with respect to the position of the connection points and the theoretical axles (9 and 18), they also have the same contour and, except for the control lever (14) and the hand wheel (25), have the same look. Mounting the seat results in no change when joint fitting (16) instead of joint fitting (5) is assembled or vice versa. As long as the fitting parts are connected so they can detach from the seat mount (3) and the upholstery supports (8) of the seat back (7), a gear fitting can even be exchanged later for a groove fitting and vice versa.

Figure 5:
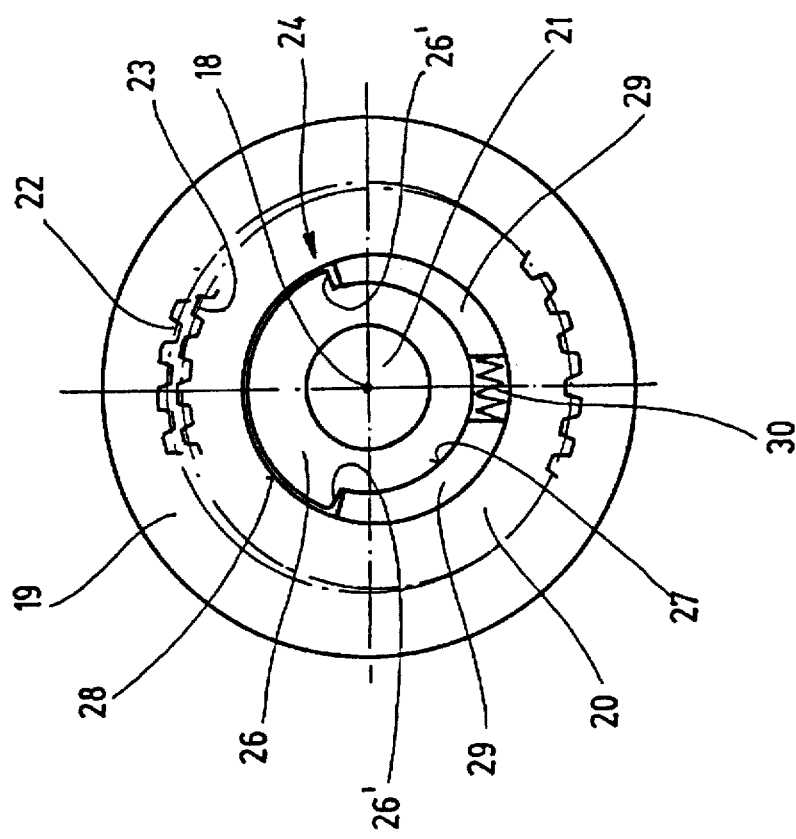
FIG. 5 is a view of the gear of the gear fitting in accordance with FIG. 3.

The gear of the joint fitting (16) represented in FIG. 5 displays an internal gear (22) (which is only incompletely drawn) that is placed concentrical to the pivot pin (21). This internal gear (22) can be provided on a ring tightly connected to a fitting part (in the working example to the upper fitting part (19)) or on the fitting part itself. An external gear (23) (also only incompletely drawn) is positioned eccentrically to this internal gear (22), whereby the eccentricity is chosen to be large enough so that only some of the teeth of the external gear (23) always mesh with the teeth of the internal gear (22). The external gear (23) can be provided connected tightly to another fitting part (in the working example to the lower fitting part (20)) or also to the fitting part itself. The fitting part supplied with the external gear (23) is positioned so that it can turn on a cam, the whole of which is designated as (24). When the cam (24) is turned by a turning motion of the pivot pin (21) to a corresponding angle, the area of both gears also shifts while they mesh with one another around the same angle, as is known with gear systems. Actuation of the pivot pin (21) follows via the help of a hand wheel (25) connected tightly to the pivot pin (21), the former capable of being turned in both rotation directions to change the swinging position of the seat back (7) in one or the other direction; actuation of the pivot pin (21) can, however, also follow by means of a motor.

The difference in the number of teeth is, together with the bearing friction, chosen in such a way that the gear is self-locking. The gear system formed by both toothed wheels need not be self-locking if it is powered by a gear motor displaying a self-locking gear.

In the working example, the gear fitting is provided with a device that keeps the two gearings (22 and 23) in mesh without backlash as long as the mechanism is at rest. For this purpose, the cam (24) displays a disk (26) resistant to rotation and positioned on the pivot pin (21), which originates from the point of the greatest eccentricity of the cam (24) in both directions over angles of equal size that together equal more than 180° and which, moreover, possesses a centrical surface area (27) with a smaller radius instead of an eccentrical surface area. In the spaces existing from this and extending at the point of the greatest eccentricity between the centrical surface area (27) and the bearing surface (28) of the lower fitting part (20) there are two mirror-inverted tapered segments (29) that have the same design and are essentially matched to the form of these spaces, between which a prestressed compression spring (30) is located, which presses the two tapered segments (29) into the spaces so far that the internal gear (22) meshes into the external gear (23) without backlash.

If the pivot pin (21) is turned in either direction, one of the two stops (26') of the disk (26) causes one of the two tapered segments (29) to be carried over the compression spring (30) by the stop and the other tapered segment (29) to be carried over the compression spring (30) by the tapered segment first mentioned, which in turns reduces the eccentricity to a value yielding the necessary free motion for the gear to run. Only when the gear stops again will the two tapered segments (29) completely eliminate the free motion due to the power of the compression spring (30).

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A vehicle seat apparatus comprising a stationary seat mount for supporting a seat cushion, a movable support for supporting a seat back cushion, a swivel pin extending in a transverse direction of said stationary seat mount, and at least two different, interchangeable joint fittings, wherein said seat mount and said movable support are adapted to be operably connected with one of said at least two different, interchangeable joint fittings, with at least one of said joint fittings having a plurality of gear elements and a drive means, and at least one other of said joint fittings having a locking elements/control lever assembly, with each joint fitting having an upper fitting part connectable to said movable support and a lower fitting part connectable to said seat mount, with said fitting parts having predetermined configurations of connection holes so as to match connection points provided on said seat mount and said movable support, whereby said joint fittings are interchangeably connectable to said seat mount and said movable support and operably engageable with said swivel pin without altering a position of said swivel pin or said connection points of said seat mount and said movable support.

2. The apparatus of claim 1, wherein each joint fitting includes means for providing backlash-free locking of said movable support.

3. The apparatus of claim 1, wherein said drive means for said joint fittings having a plurality of gear elements is selected from the group consisting of a hand wheel and a motor.

4. The apparatus of claim 1, wherein said locking elements/control lever assembly further comprises an internal gear concentric to said swivel pin and connected to said upper fitting part of said joint fitting, said internal gear having a ring of groove openings, a radial array of locking bodies provided on said lower fitting part of said joint fitting, and means for moving said locking bodies into and out of engagement with said groove openings.

5. The apparatus of claim 4, wherein said means for moving said locking bodies further comprises a control lever connected to said swivel pin and a prestressed annular spring spanning at least two windings and positioned for contacting said locking bodies, said spring having a first end connected so as to move radially with said first part of said joint fitting and a second end connected so as to move radially with said control lever, with only said second end being able to move in a circumferential direction.

6. The apparatus of claim 1, wherein said joint fittings are removably connected to said movable support and to said seat mount.

7. The apparatus of claim 1, wherein said at least one joint fitting having a plurality of gear elements and drive means further comprises an internal gear positioned concentrical to said swivel pin and provided on said upper fitting part of said joint fitting, an external gear provided on said lower fitting part of said joint fitting and positioned eccentrically to said internal gear, said internal and external gears having teeth extending therefrom, a cam connected to said swivel pin and to said first part of said joint fitting, and rotating means connected to said swivel pin for rotating said swivel pin.

8. The apparatus of claim 7, wherein said rotating means is selected from the group consisting of a hand wheel and a motor.

9. The apparatus of claim 1, wherein each joint fitting provides for a continuous adjustment of a degree of incline of said movable support with respect to said seat mount.

10. The apparatus of claim 1, wherein said connecting points of said seat mount and movable support are bores for receiving and securing connectors extending through said holes in said upper and lower fitting parts.

* * * * *